Oct. 18, 1955     S. B. SIEFKEN     2,720,858
IMPLEMENT FOR CLEANING SUBMERGED SURFACES
Filed Dec. 4, 1952
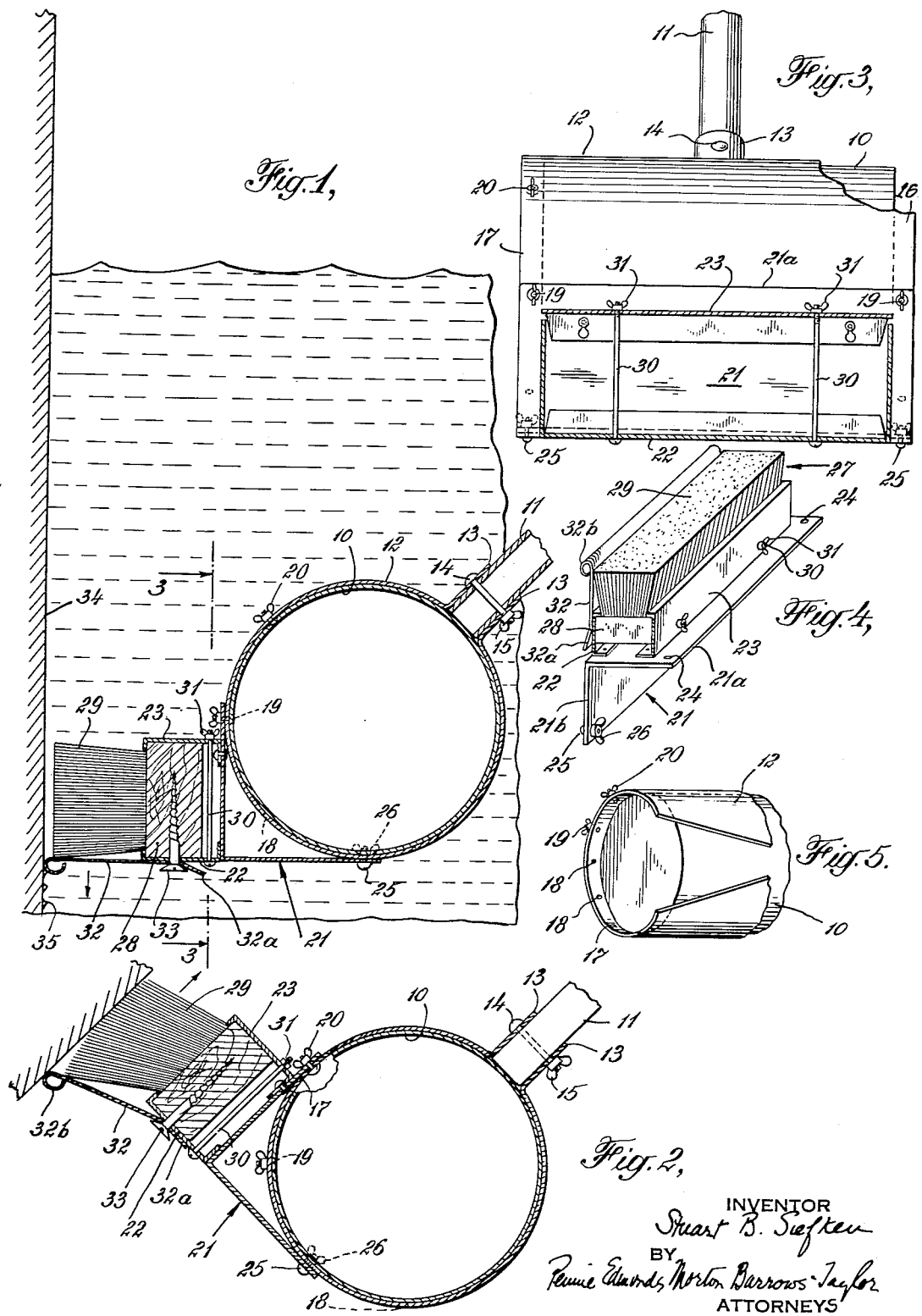
INVENTOR
Stuart B. Siefken
BY
ATTORNEYS

United States Patent Office 2,720,858
Patented Oct. 18, 1955

2,720,858
IMPLEMENT FOR CLEANING SUBMERGED SURFACES

Stuart B. Siefken, Bronx, N. Y.

Application December 4, 1952, Serial No. 324,072

1 Claim. (Cl. 114—222)

This invention relates to implements for cleaning surfaces to remove adherent matter therefrom and is concerned more particularly with a novel implement for cleaning surfaces lying beneath the surface of a liquid. The new implement may be employed to especial advantage in cleaning the submerged surfaces of the hulls of boats, floats, etc. and a form of implement for such use will be illustrated and described for purposes of explanation.

As is well known, marine growth collects on the underwater surfaces of boat hulls and so impedes movement of a boat through the water that periodic cleaning is required. Heretofore, such cleaning has ordinarily been done only when the boat has been removed from the water and it is thus customary to clean the hull of a pleasure boat only between sailing seasons. As the hull may become quite foul before the end of a season, cleaning at shorter intervals would be desirable, but, up to the present, no cleaning implement satisfactory for the purpose has been available.

The present invention is directed to the provision of an implement for cleaning submerged surfaces, which is easy to handle and can be readily used without imposing severe strains on the person using it. The implement is provided with a buoyant head and a handle of suitable length and the head carries cleaning means, by which material closely adherent to the submerged surface can be loosened and removed. Because of the buoyancy of its head, the implement may be easily manipulated in the cleaning of the hull of a boat by a user standing on a dock or in a nearby boat and prolonged use of the implement does not greatly tire the operator.

For a better understanding of the invention, reference may be had to the accompanying drawing, in which Fig. 1 is a vertical sectional view through one form of the new implement, the view showing the implement in use in cleaning a substantially vertical submerged surface;

Fig. 2 is a view similar to Fig. 1, but showing the implement with the cleaning elements adjusted for cleaning an overhanging submerged surface;

Fig. 3 is a sectional view on the line 3—3 of Fig. 1;

Fig. 4 is a perspective view of the mounting for the cleaning elements; and

Fig. 5 is a perspective view of one end of the head of the implement.

The implement in the form illustrated in the drawings comprises a head, which includes a buoyant member, preferably in the form of a closed cylindrical tank 10. A handle 11 is attached to the tank and extends outwardly from the curved surface thereof. The handle may be attached to the tank in any suitable manner, but, preferably, a metal sleeve 12 encloses the tank and has cooperating ends 13 defining a socket, in which the end of the handle is received, the handle being held in place by a bolt 14, which extends through openings in the ends of the sleeve and the handle and is provided with a wing nut 15. The bolt prevents the handle from being withdrawn from the socket and, by tightening the wing nut, the ends of the sleeve are caused to clamp the end of the handle tightly, so that the handle is held rigidly in place.

The sleeve is preferably wider than the tank is long, so that the lateral edges of the sleeve form flanges 16, 17 projecting beyond the tank at opposite ends. Each flange is provided with spaced openings 18 shown as four in number, and screws 19 provided with wing nuts 20 are permanently secured in two of the openings.

A mounting for the cleaning means is attached to the sleeve and the mounting may conveniently take the form of an angle iron 21 having a length about equal to the width of the sleeve. A channel member 22 is rigidly secured to one flange 21a of the angle iron and a second channel member 23 is secured to the same flange in spaced relation to the first, with the flanges of the two channel members extending toward each other. Channel member 23 is attached to flange 21a of the angle iron by slot and rivet connections, so that it can be shifted on the flange to vary its spacing from channel member 22. Flange 21a of the angle iron is provided with openings 24 at opposite ends near its outer edge and the other flange 21b of the angle iron carries a pair of permanently attached screws 25 at opposite ends near its outer edge, the screws being provided with wing nuts 26.

The mounting carries a cleaning element 27 in the form of a brush made up of a block 28 with a body of bristles 29. The block is receivable in the channels of members 22, 23 and can be clamped tightly in place by screws 30 extending through openings in channel members 22, 23 and provided with wing nuts 31. A scraping plate 32 may be mounted on one of the channel members 22, 23 and, in the implement illustrated, plate 32 is secured to channel member 22. For this purpose, the plate is formed with holes, through which screws 33 are passed, the screws extending through openings in channel member 22 and into block 28 of the brush. The end section 32a of the plate inward from the holes for the screws is bent at an angle to the remainder of the plate and the screws are smaller than the holes in the plate, so that the plate can swing about an axis through the ends of the screws from the position occupied by the plate in Fig. 1 to the position of the plate shown in Fig. 2. The outer end of the plate may be stiffened by being bent back upon itself to form a bead 32b.

The openings 18 in each flange of sleeve 12 are spaced 45°, and the size of the angle iron 21 is such that it can be secured in place on the sleeve with a screw 19 in each flange of sleeve 12 entering an opening 24 in flange 21a of the angle iron and the screws 25 in the flange 21b of the angle iron then entering another pair of openings 18 in the flanges on the sleeve at opposite ends thereof. The mounting can, accordingly, be secured in place with the brush and scraping plate extending outward from the tank at an angle of 135° from the axis of the handle, as shown in Fig. 1, or at an angle of 90° from the axis of the handle, as shown in Fig. 2.

The position of the mounting on the sleeve in relation to the axis of the handle will depend on the slope of the surface to be cleaned. Thus, when the surface being operated on is substantially vertical, as shown in Fig. 1, the mounting is adjusted, so that the cleaning means extend at an angle of about 135° from the axis of the handle. The user may then stand on a dock or in a nearby boat and clean the surface by moving the head of the implement up and down through the water. As the implement is moved downward, as shown in Fig. 1, the scraping plate bears against the submerged surface 34 and loosens or scrapes off the adhering matter indicated at 35. When the implement is next moved upward, as shown in Fig. 2, the bristles of the brush clean off the loosened matter and the flexing of the brush is limited by the scraping plate, so that the effectiveness of the brush is maintained. In such upward movement, the plate also bears against the surface and acts to dislodge material over which the brush has passed. When it is desired to clean an overhanging submerged surface, the position of the mounting on the sleeve is changed to that shown in Fig. 2. For this purpose, the mounting is released from the sleeve, shifted to the desired new position, and again held in place by the screws 19, 25 and their wing nuts.

If the brush becomes worn and must be replaced in the course of time, the screws 33 are removed and the wing nuts 31 removed from bolts 30. The channel member 23 may then be displaced sufficiently to permit the brush to be slipped from between the channels and a new one installed.

While other means for securing the handle and cleaning elements to the tank may be used, the construction illustrated and described is preferred, since it permits the use of a tank, the wall of which is not pierced by any part of the means for securing the mounting and handle to the tank. If openings in the tank wall were necessary for screws or bolts for attaching the handle or cleaning elements, it would be difficult to maintain the tank watertight and loss of buoyancy and corrosion would then occur.

I claim:

An implement for cleaning submerged surfaces, which comprises a buoyant tank of generally cylindrical form, a sleeve extending about the tank and having flanges projecting beyond the ends of the tank, a handle attached to the sleeve and projecting outwardly from the tank normal to the longitudinal axis thereof, a mounting attached to the flanges of the sleeve and extending lengthwise of the tank, and cleaning means attached to the mounting and extending outwardly therefrom at an angle to the axis of the handle.

References Cited in the file of this patent

UNITED STATES PATENTS

| | | |
|---|---|---|
| 565,042 | Slocum | Aug. 4, 1896 |
| 893,080 | Kuettner | July 14, 1908 |
| 1,471,935 | Arentz | Oct. 23, 1923 |
| 1,862,404 | Jayne | June 7, 1932 |

FOREIGN PATENTS

| | | |
|---|---|---|
| 30,025 | Denmark | Aug. 9, 1921 |
| 450,879 | Great Britain | July 1936 |